United States Patent [19]

Mareydt

[11] 4,343,419

[45] Aug. 10, 1982

[54] ARTICLE CARRIER TIE-DOWN AND END PIECE

[75] Inventor: Ray G. Mareydt, Warren, Mich.

[73] Assignee: Four Star Corporation, Troy, Mich.

[21] Appl. No.: 270,183

[22] Filed: Jun. 3, 1981

[51] Int. Cl.³ .............................................. B60R 9/00
[52] U.S. Cl. .................................................. 224/326
[58] Field of Search ............... 224/326, 323, 324, 325, 224/327

[56] References Cited

U.S. PATENT DOCUMENTS

| 4,055,285 | 10/1977 | Bott | 224/326 |
| 4,182,471 | 1/1980 | Bott | 224/326 |
| 4,266,708 | 5/1981 | Bott | 224/326 |

*Primary Examiner*—Steven M. Pollard
*Attorney, Agent, or Firm*—Reising, Ethington, Barnard, Perry & Brooks

[57] ABSTRACT

An end piece and tie-down member for a low profile article-supporting slat wherein the member includes a depending portion which coacts with an opening in the base of the slat to prevent rotation or misalignment of the member relative to the slat.

5 Claims, 3 Drawing Figures

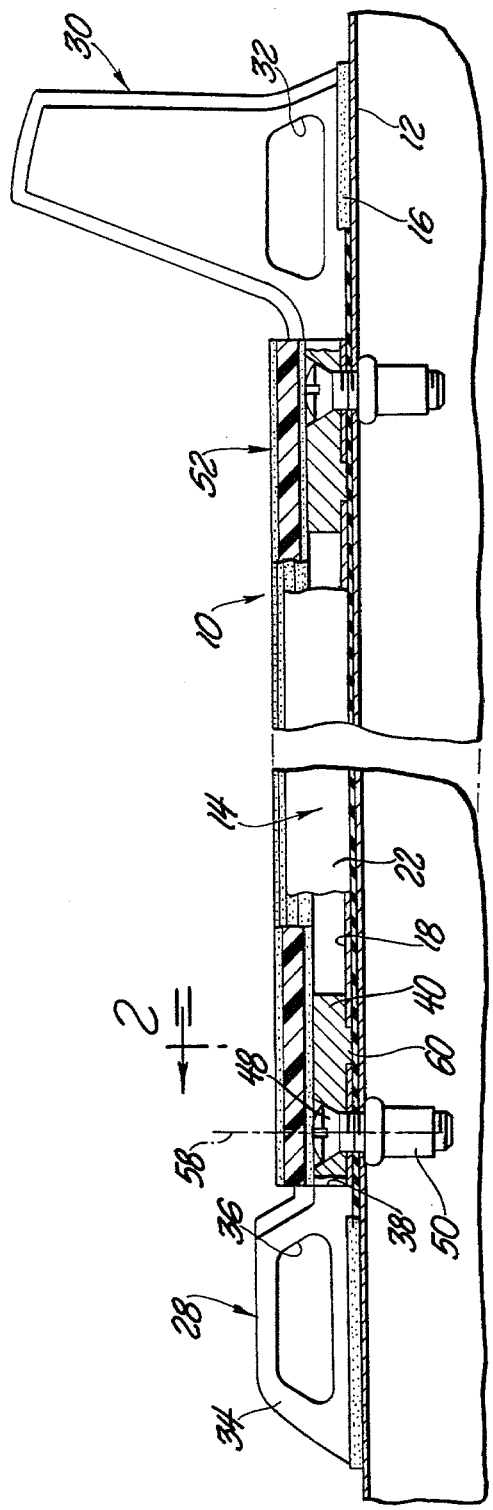
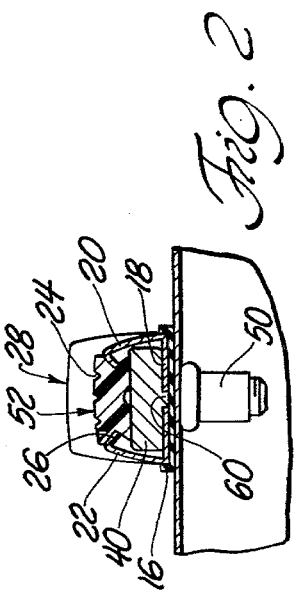

ARTICLE CARRIER TIE-DOWN AND END PIECE

TECHNICAL FIELD

The present invention relates to article carriers of the type including a low profile, hollow slat which includes one or more combination end pieces and tie-down members each of which includes a tongue-like portion telescopingly received in an open end of the slat. Normally, a plurality of parallel and spaced slats are mounted on an exterior vehicle surface, such as on the roof or trunk, and support articles such as boxes or luggage. To retain the articles on the slats, the slat end pieces are provided with openings adapted to anchor straps, ropes, hooks or the like which are used to secure the articles upon the slats. It is common to use a single or common fastening means, such as a screw and riv nut, for securing the end of the slat and the coacting tie-down end piece to the vehicle surface.

BACKGROUND ART

A slat and coacting tie-down end piece of this general type is shown in U.S. Pat. No. 4,055,284 Bott.

In lashing the straps or other retaining members about the slat-supported articles and anchoring the same to the slat end pieces, there is a tendency to impart a force tending to rotate the end piece about the axis of the single fastening means which secures the end piece to the vehicle surface. The Bott patent would seek to avoid such end piece rotation by making the telescoping portion of his end piece of the same shape and size as the interior of his hollow slat. Several problems arise with the Bott end piece design. First, if the telescoping portion is over-size relative to the slat end, the end piece cannot be inserted in the slat. If under-size relative to the slat, the telescoping portion allows the end piece to be rotated or skewed relative to the slat. Next, and particularly when thin wall sections are utilized in the slat, a rotating force applied to the end piece can cause the side walls of the slat to be cammed or flexed outwardly by the inserted portion of the end piece and thereby to release the super-adjacent portion of an elastomeric rub strip resiliently retained in the slat groove.

DISCLOSURE OF THE INVENTION

Applicant's invention provides a tie-down end piece wherein the cross sectional size of the tongue-like portion adapted to project telescopingly within the hollow slat is not critical, assuring easy and consistent insertion of the end piece. Further, the telescoping tongue-like portion does not coact with and, therefore, cannot outwardly cam or flex the side walls of the slat. Instead, a stud-like projection is formed on the tongue-like portion of the end piece and coacts with a mating opening in the base section of the slat to prevent rotation of the end piece about the common fastening means axis.

The details of applicant's invention will be understood by reference to the drawings and the detailed description which follows.

BRIEF DESCRIPTION OF DRAWINGS

In the drawings:

FIG. 1 is a partially sectioned side elevational view showing a slat and end piece assembly;

FIG. 2 is an end section along lines 2—2 of FIG. 1; and

BEST MODE FOR CARRYING OUT THE INVENTION

Figure 3:
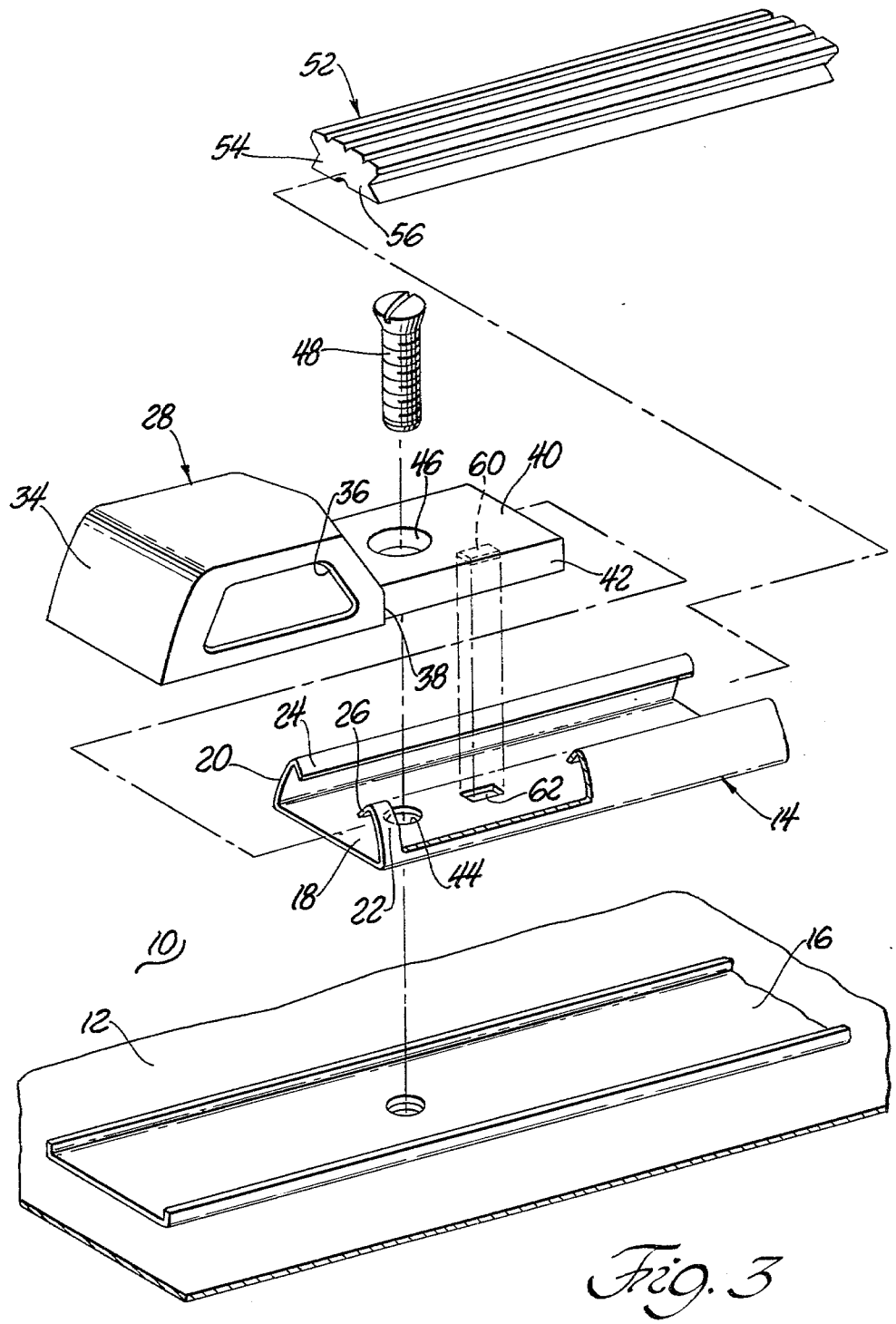
FIG. 3 is an exploded perspective view showing the elements of the invention.

Referring particularly to FIGS. 1 and 3 of the drawings, a portion of a vehicle article carrier is indicated generally at 10. The article carrier is adapted to be mounted on a vehicle surface 12 which may, for example, be a part of the vehicle roof or trunk. While only one such is shown, it is most common to use a plurality of low profile slat members 14 transversely spaced in parallel relationship across the vehicle surface 12 in order to protect the vehicle surface and support thereon articles such as boxes, luggage or the like. In order to protect the vehicle surface 12 against abrasion or collecting moisture, a resilient pad 16 is disposed between slat 14 and the vehicle surface.

Slat 14 is normally fabricated of a thin walled metal such as steel or aluminum and may be formed by any well known process such as extruding, casting or roll forming. More specifically referring to FIGS. 2 and 3 of the drawings, slat 14 includes a normally flat base section 18 from the transverse outer edges of which upwardly extending side walls 20 and 22 project and terminate at their upper ends in downwardly and inwardly inclining end portions 24 and 26 which are transversely spaced to provide an upwardly opening groove which extends throughout the length of the slat.

It is normal practice with such article carriers to utilize end pieces such as 28 and 30 to enclose the open end of the hollow slats. Such end pieces perform several functions including giving the slat a more finished appearance, providing a stop should the slat also incorporate and support longitudinally adjustable tie-down or cross rail members. In the present invention, the end pieces are fixed or non-adjustable with respect to the slat member 14. The invention will be described specifically in relation to end piece 28. End piece 30 is typically of the high rising type adapted for use when the article carrier is mounted on a vehicle trunk and is adapted to include a transversely extending cross portion, not shown, above the vehicle surface and which engages and prevents sliding movement of an article such as a box or piece of luggage. End piece 30 also includes a tie-down strap or hook-receiving opening 32.

Referring now to end piece 28, such member may be formed of a die-cast metal or hard plastic and includes a main body portion 34 which has a strap or hook-receiving opening 36 formed transversely therethrough. Main body portion 34 includes a vertical inner wall or face 38 adapted to abut against the ends of slat walls 20 and 22 when assembled to slat 14. As best seen in FIGS. 1 and 2, the main portion 34 of end piece 28 rises slightly above the vertical height of slat 14 but is generally of the same width as the slat. In other words, inner face or wall 38 of main body portion 34 would be substantially of the same width as slat 14.

An integral tongue-like portion 40 projects forwardly from wall 38 of main portion 34. As will be seen in FIGS. 2 and 3, the width of tongue-like portion 40 is both less than the width of main portion wall 38 and less than the cross sectional area defined by side walls 20 and 22 of slat 14. It is particularly to be noted in FIG. 2 that the height and width of tongue-like portion 40 are such as to provide horizontal and vertical clearance in relation to slat side walls 20 and 22. Since the side walls 42 of tongue-like portion 40 are intended to be transversely spaced from flat side walls 20 and 22, there is no need to shape the side walls 42 so as to conform to the shape and slope of the slat side walls. Inasmuch as the tongue-like portion 40 is made to be distinctly smaller in size than the internal dimensions of slat 14, there is never a problem of inserting such portion within the slat.

It is also the practice to utilize a single fastening means to jointly secure the end of slat 14 to the vehicle surface 12 as well as securing the end piece 28 to the slat and, therethrough, to the vehicle surface. To this end, a hole 44 is formed in base portion 18 of slat 14 and is adapted to be coaxially aligned with a corresponding hole 46 formed through the tongue-like portion 40 of end piece 28 when the end piece is assembled to the slat. A common screw member 48 is adapted to project through the registered or coaxially aligned openings 44 and 46 and to threadably engage a riv nut member 50 disposed inside of the vehicle surface 12.

In order to enclose the upwardly opening slat 14 and also to provide abrasion protection for any article mounted upon the slats, a rub strip 52 is adapted to be fitted within the open groove of the slat. As best seen in FIG. 3, the rub strip 52 may be a molded plastic or elastomeric member formed to provide outwardly diverging lower legs 54 and 56 which are adapted to be snapped within and retained beneath the inwardly diverging ends 24 and 26 of slat side walls 20 and 22.

In securing straps or hooks within end piece openings 36 to retain articles upon the slats 14, there is a tendency to impose sideward forces on the end piece 28 tending to rotate the latter about the axis 58 of the fastening screw 48. Unless otherwise prevented, such a rotating force will cause the tongue-like portion 40 of end piece 28 to cam against and flex outwardly the upstanding walls 20 or 22 of slat 14 allowing the superadjacent portion of the rub strip 42 to become disengaged from the slat. To prevent such rotation of end piece 28 and to maintain the same properly aligned with slat 14, a stud-like member 60 is formed on and projects downwardly from the bottom surface of tongue-like projection 40. A correspondingly shaped hole 62 is formed in the base portion 18 of slat 14 and is adapted to receive the stud-like projection 60 when the end piece 29 is assembled to the slat. As already noted, the cross section of tongue-like portion 40 is sufficiently smaller than the internal cross section of slat 14 as to enable the stud-like projection 60 to clear the edge of base portion 18 as portion 40 is inserted within the open end of the slat. After it has cleared the edge of base portion 18, stud-like projection 60 can drop within slat opening 62 following which screw member 48 may be engaged with the riv nut 50 to secure the end piece 28 to the slat 14. In this way, end piece projection 60 coacts with the slat opening 62 to prevent any rotation of the end piece 28 and also prevents any contact between the tongue-like portion 40 and the upstanding walls 20 and 22 of slat 14. To facilitate alignment and insertion within slat opening 62, end piece projection 60 can be tapered if desired.

It is to be understood that other modifications are possible within the intended scope of the invention as set forth in the hereinafter appended claims.

What is claimed is:

1. An article carrier of the type comprising a low profile, hollow slat for mounting on a vehicle surface and a unitary member adapted to close one end of said slat, the slat including a base portion, side walls extending upwardly from said base portion and terminating in transversely spaced end portions vertically spaced above said base portion, said base portion and side walls defining an upwardly opening groove, a first opening formed through said base portion proximate one end of the slat, said unitary member including a main body portion having an opening therethrough for receiving an article tie-down member and a tongue-like portion extending longitudinally from the main body portion and adapted to project within said hollow slat whereby said main body portion encloses the one end of said slat, said tongue-like portion including an opening adapted to be in coaxial registry with the slat opening when the tongue-like member is disposed within said slat, and fastening means extending through the coaxial openings to secure said slat and said unitary member to the vehicle surface, the improvement comprising:
   a second opening formed in said slat;
   a stud-like element projecting from the tongue-like portion of the unitary member and longitudinally spaced from the opening in the tongue-like portion, the stud-like element coacting with the second slat opening to prevent rotation of the unitary member about the coaxially related openings.

2. An article carrier of the type comprising a low profile, hollow slat for mounting on a vehicle surface and a unitary member adapted to close one end of said slat, the slat including a base portion, side walls extending upwardly from said base portion and terminating in transversely spaced end portions vertically spaced above said base portion, said base portion and side walls defining an upwardly opening groove, a first opening formed through said base portion proximate one end of the slat, said unitary member including a main body portion having an opening therethrough for receiving an article tie-down member and a tongue-like portion extending longitudinally from the main body portion and adapted to project within said hollow slat whereby said main body portion encloses the one end of said slat, said tongue-like portion including an opening adapted to be in coaxial registry with the slat opening when the tongue-like member is disposed within said slat, and fastening means extending through the coaxial openings to secure said slat and said unitary member to the vehicle surface, the improvement comprising:
   a second opening formed in the base portion of said slat and longitudinally spaced from said first opening;
   a stud-like element projecting from the tongue-like portion of the unitary member and longitudinally spaced from the opening in the tongue-like portion, the stud-like element coacting with the second slat opening to prevent rotation of the unitary member about the coaxially related openings.

3. An article carrier of the type comprising a low profile, hollow slat for mounting on a vehicle surface and a unitary member adapted to close one end of said slat, the slat including a base portion, side walls extending upwardly from said base portion and terminating in transversely spaced end portions vertically spaced above said base portion, said base portion and side walls defining an upwardly opening groove, a first opening formed through said base portion proximate one end of the slat, said unitary member including a main body portion having an opening therethrough for receiving an article tie-down member and a tongue-like portion extending longitudinally from the main body portion and adapted to project within said hollow slat whereby said main body portion encloses the one end of said slat, said tongue-like portion including an opening adapted to be in coaxial registry with the slat opening when the tongue-like member is disposed within said slat, and fastening means extending through the coaxial openings to secure said slat and said unitary member to the vehicle surface, the improvement comprising:

- a second opening formed in the base portion of said slat and longitudinally spaced from said first opening;
- a stud-like element projecting from the tongue-like portion of the unitary member and longitudinally spaced from the opening in the tongue-like portion, the stud-like element coacting with the second slat opening to prevent rotation of the unitary member about the coaxially related openings; the tongue-like member of said unitary member being smaller in cross section than the cross section of said hollow slat whereby the tongue-like member can move vertically to enable the stud-like element to clear the slat base portion until the element is in registry with the second slat opening.

4. An article carrier as defined in claim 3 wherein the stud-like element projects downwardly from the bottom surface of said tongue-like portion.

5. An article carrier of the type comprising a low profile, hollow slat for mounting on a vehicle surface and a unitary member adapted to close one end of said slat, the slat including a base portion, side walls extending upwardly from said base portion and terminating in transversely spaced end portions vertically spaced above said base portion, said base portion and side walls defining an upwardly opening groove, a first opening formed through said base portion proximate one end of the slat, said unitary member including a main body portion having an opening therethrough for receiving an article tie-down member and a tongue-like portion extending longitudinally from the main body portion and adapted to project within said hollow slat whereby said main body portion encloses the one end of said slat, said tongue-like portion including an opening adapted to be in coaxial registry with the slat opening when the tongue-like member is disposed within said slat, and fastening means extending through the coaxial openings to secure said slat and said unitary member to the vehicle surface, the improvement comprising:

- a second opening formed in said slat;
- a stud-like element depending from the bottom surface of the tongue-like portion of the unitary member and longitudinally spaced from the opening in the tongue-like portion, the stud-like element coacting with the second slat opening to prevent rotation of the unitary member about the coaxially related openings.

* * * * *